United States Patent [19]

Ota et al.

[11] Patent Number: 4,674,769

[45] Date of Patent: Jun. 23, 1987

[54] STEERING SYSTEM WITH TILTABLE STEERING COLUMN

[75] Inventors: Shuji Ota, Okazaki; Toshihiro Nishio, Takahama, both of Japan

[73] Assignee: Kabushiki Kaisha Toyoda Jidoshokki Seisakusho, Kariya, Japan

[21] Appl. No.: 764,258

[22] Filed: Aug. 9, 1985

[30] Foreign Application Priority Data

Aug. 11, 1984 [JP] Japan .................... 59-123584[U]

[51] Int. Cl.<sup>4</sup> ............................................. B62D 1/18
[52] U.S. Cl. .................................. 280/775; 74/493; 180/89.17; 180/329; 280/779
[58] Field of Search .............................. 280/775, 779; 180/89.17, 326, 329, 89.18; 74/493, 494, 484 R

[56] References Cited

U.S. PATENT DOCUMENTS

| 729,538 | 6/1903 | Buffum | 280/775 |
| 4,312,418 | 1/1982 | Rittman | 180/89.17 |

FOREIGN PATENT DOCUMENTS

| 1247951 | 3/1962 | France | 280/775 |
| 1401914 | 4/1965 | France | 280/775 |
| 86863 | 7/1981 | Japan | 74/493 |
| 163963 | 12/1981 | Japan | 74/493 |
| 15063 | 1/1982 | Japan | 74/493 |

Primary Examiner—David M. Mitchell
Assistant Examiner—Everett G. Diederiks, Jr.
Attorney, Agent, or Firm—Brooks, Haidt, Haffner & Delahunty

[57] ABSTRACT

A steering system for a forklift truck having a tiltable steering column which rotatably supports a steering shaft carrying a steering wheel. The tiltable steering column is pivotally supported between its operative position and its rest position, about a pivot axis parallel to an axis of rotation of drive wheels of the truck. The system comprises: a biasing spring for biasing the steering column toward its rest position; an engaging member provided on the steering column; a locking member for locking the steering column in the operative position, the locking member being supported movably between its locking position and its unlocking position, and when placed in the locking position, engaging the engaging member of the steering column in the operative position; and an actuator associated with the locking member to move the locking member to the unlocking position and thereby permit the steering column to be pivoted to the rest position under a biasing action of the biasing spring.

11 Claims, 7 Drawing Figures

STEERING SYSTEM WITH TILTABLE STEERING COLUMN

BACKGROUND OF THE INVENTION

1. Field of the Art

The present invention relates generally to a steering system with a tiltable or inclinable steering column for a forklift truck, and more particularly to a device for tilting a steering column from its operative position to its inoperative or rest position or vice versa, with a simple manipulation by the operator.

2. Related Art Statement

In a forklift truck, it is sometimes required to tilt or pivot a steering column with a steering wheel from its normal operative position to a rest position away from an operator's seat, so as to provide an ample space between the steering column or wheel and the operator's seat. In a small-sized forklift truck, for example, a relatively small distance is provided between the front end of an engine hood 27, and a steering wheel 1 fixed to the upper end of a steering shaft, as indicated in FIG. 7. In the meantime, the engine hood 27 is usually required to pivot about an axis parallel to an axis of rotation of drive wheels, between its normal closed position and its upper open position for an access to the engine assembly of the truck. To avoid an interference of the front end of the engine hood 27 with the steering wheel 1 during a pivoting movement of the engine hood 27 to its open position, it is a common practice to provide a separate toe board 31 which is fixed to a frame of the forklift truck so that the separate toe board 31 cooperates with the engine hood 27 to enclose the engine assembly.

The above-addressed problem of interference may be solved by providing a device which permits the steering column to be tilted from its operating position to a position away from the operator's position (seat). Generally, such a device for tilting the steering column is designed for providing plural operating positions of the steering wheel which are selected to suit different physical constitutions of the operators of the truck. However, a relatively cumbersome procedure is required to change the operating position of the steering column. Thus, most of the known tilting devices do not permit the operator to adjust the steering wheel position, with a simple procedure.

SUMMARY OF THE INVENTION

It is therefore an object of the present invention to provide a steering system for a forklift truck, having means for permitting the steering column to be tilted from its operative position to its inoperative or rest position, with a simple manipulation of an actuator by the operator.

Another object of the invention is the provision of a steering system with a tiltable steering column for a forklift truck, which has a device that permits the tiltable steering column to be tilted from its operative position to its inoperative position, in response to a pivoting movement of the engine hood from its normal closed position to its open position.

According to the invention, there is provided a steering system for a forklift truck, comprising: (a) a steering wheel; (b) a steering shaft to which said steering wheel is fixed; (c) a tiltable steering column for rotatably supporting said steering shaft, said steering column being supported by a frame of the forklift truck pivotally between its operative position and its rest position, about a pivot axis parallel to an axis of rotation of drive wheels of the forklift truck; (d) a biasing spring disposed between said frame and said steering column, for biasing the steering column toward its rest position; (e) engaging means provided on said steering column; (f) a column locking member for locking said steering column in said operative position, said column locking member being supported movably between its locking position and its unlocking position, and when placed in said locking position, engaging said engaging means on said steering column in said operative position; and (g) actuator means associated with said column locking member to move the column locking member to said unlocking position and thereby permit said steering column to be pivoted to said rest position under a biasing action of said biasing spring.

In the steering system according to the invention constructed as described above, the tiltable steering column is automatically moved to its rest position by a biasing force of the biasing spring, upon manipulation of the actuator to move the column locking member to its unlocking position. As a result, there is provided a comparatively large space or distance between the steering wheel or column and the operator's seat.

According to one embodiment of the invention, the engaging means provided on the steering column comprises a movable member which is adapted to move in a pivoting direction of the steering column. In a preferred form of this embodiment, the steering column has a column support secured thereto so as to extend in the pivoting direction. The column support has an arcuate guiding portion along a circular arc which has a center on the pivot axis of the steering column. The movable member comprises a slider which is movable along the arcuate guiding portion and fixed at a selected point along the circular arc. The column locking member comprises a locking hook supported by the frame pivotally between the locking and unlocking positions. When the locking hook is placed in the locking position, the locking hook engages the slider to thereby lock the steering column in the operative position.

In the above form of the steering system, the steering column may be moved to its rest position by disengaging the locking hook from the slider. Further, the angle of tilt of the steering column may be adjusted continuously by moving the slider along the arcuate guiding portion of the column support and fixing the slider at the desired point along the arc of the guiding portion.

According to an advantageous arrangement of the above-indicated form of the invention wherein the slider movable on the column support engages the locking hook, the column support is a member of a generally U-shaped cross sectional configuration having a pair of arm portions extending in the pivoting direction, and further having a connecting portion connecting the arm portions. The column support is fixed at its connecting portion to the steering column. The arcuate guiding portion of the column support comprises a pair of arcuate slots formed in the pair of arm portions, respectively, and the engaging means consists of at least one of a pair of nuts slidably on the arm portions along the arcuate slots, respectively. The column support is provided with a spacer sleeve disposed between the arm portions, and a clamp screw inserted through the arcuate slots and the spacer sleeve. The clamp screw has a right-hand thread engaging one of the nuts, and a left-hand thread engaging the other nut. When the clamp screw is rotated in one direction, the nuts are moved toward each other to urge the pair of arm portions against opposite ends of the spacer sleeve and thereby clamp the nuts to the column support. When the clamp screw is rotated in the other direction, the nuts are moved away from each other and allowed to be slidably moved on the arm portions along the arcuate slots.

According to another advantageous arrangement of the above-indicated form of the invention, the steering system further comprises a front protector extending upwardly from a front end of the frame of the truck, and a steering bracket of a generally U-shaped cross sectional configuration. The steering bracket has a pair of side plates and a base portion connecting the side plates, and is secured at its base portion to the front protector. The steering column is pivotally supported by the pair of side plates at end portions of the side plates remote from the base portion. The locking hook is pivotally supported by the steering bracket.

According to another embodiment of the invention, the forklift truck comprises an engine hood attached to the frame pivotally between its normal closed position and its upper open position, about an axis parallel to the axis of rotation of the drive wheels of the truck. The engine hood has an engaging portion engageable with a hood locking member attached to the frame, to lock the engine hood in the closed position. The hood locking member is connected to the column locking member by linking means which cooperates with the hood locking member to constitute the previously indicated actuator. The column locking member is disengaged from the engaging means of the steering column when the hood locking member is disengaged from the engaging portion of the engine hood.

In the above embodiment of the invention, the steering column may be moved to its rest position by disengaging the hood locking member from the engaging portion of the engine hood. Thus, the engine hood may be pivoted from its normal closed position to its open maintenance position without a possibility of interference with the steering wheel attached to the top of the steering shaft. Accordingly, it is not required to provide a separate member such as a toe board which cooperates with the engine hood to enclose the engine assembly. In other words, the engine assembly may be totally enclosed by an integral one-piece engine hood. Thus, the engine hood as an enclosure for the engine assembly provides a greater strength, and a higher sealing capability which contributes to a reduced level of externally heard engine noises. Further, the elimination of the toe board facilitates maintenance services of the engine assembly.

In one form of the above embodiment, the linking means comprises a wire cable inserted through an outer tube which is fixed at its opposite ends to the frame of the truck. In another form of the embodiment, the column locking member is biased by a spring toward the locking position, and the hood locking member is biased by this spring through the linking means in a direction of engagement with the engaging portion of the engine hood.

In accordance with a further embodiment of the invention, the steering shaft comprises an upper part and a lower part connected to each other by a universal joint pivotally about the pivot axis of the steering column. The steering wheel is fixed to an upper end of the upper part of the steering shaft, and the lower part of the steering shaft is connected at its lower end to a steering gearbox.

BRIEF DESCRIPTION OF THE DRAWING

The foregoing and other objects, features and advantages of the present invention will be better understood from reading the following detailed description of a preferred embodiment of the invention, when considered in conjunction with the accompanying drawing, in which.

DETAILED DESCRIPTION OF THE PREFERRED EMBODIMENT

Figure 1:
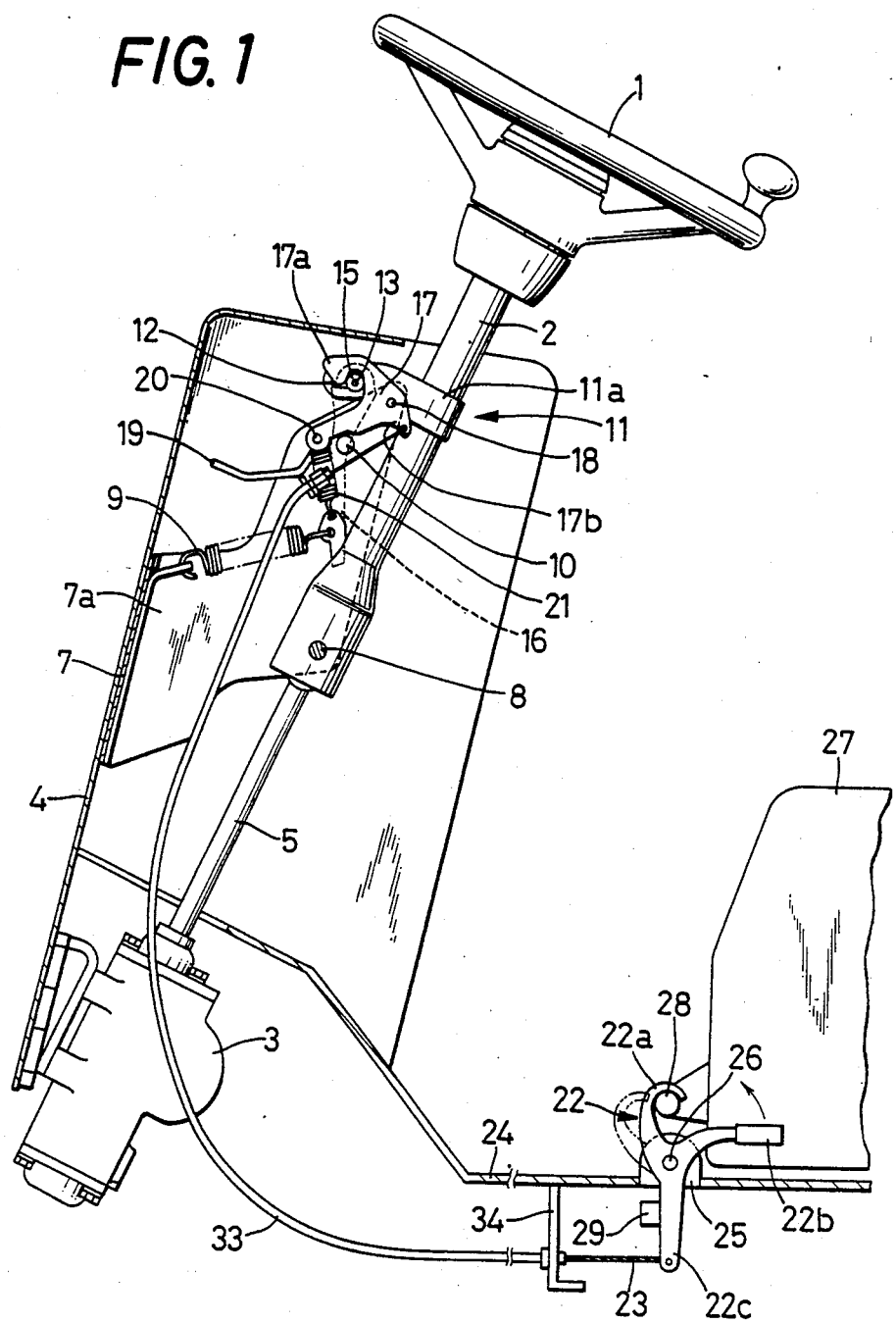
FIG. 1 is a partially-cutaway side elevational view of a steering system of a forklift truck embodying the concept of the present invention.
Figure 2:
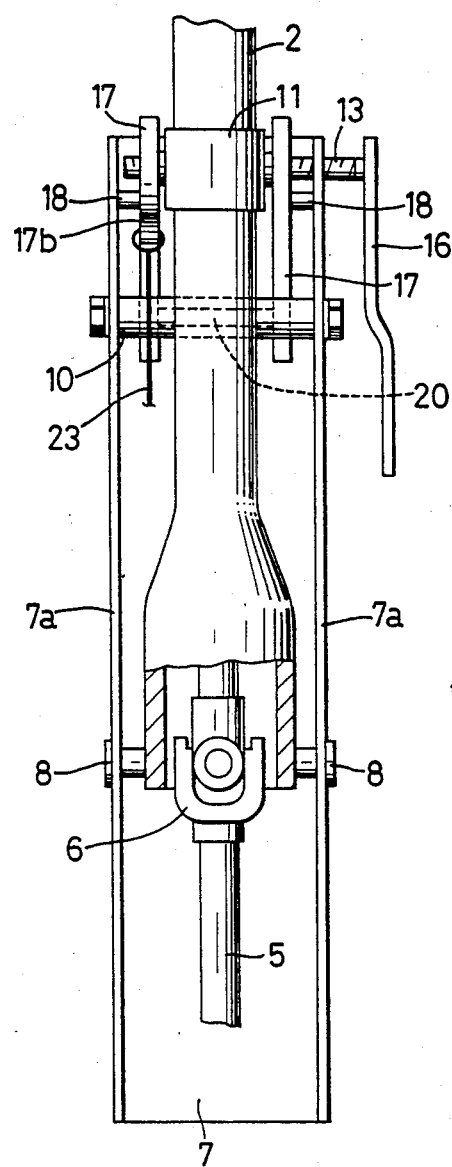
FIG. 2 is a partially-cutaway front elevational view of the steering system of FIG. 1.

Referring to FIGS. 1 through 6, there will be described in detail a preferred embodiment of the present invention in the form of a steering system linked with a device for locking an engine hood, used in a forklift truck.

In the figures, a reference numeral 1 designates a steering wheel located at the upper end of a steering column 2. A steering shaft 5 extends through and is rotatable about its axis of rotation within the steering column 2. The steering shaft 5 has an upper part and a lower part which are pivotally connected to each other by means of a universal joint 6. The steering wheel is fixed to the upper end of the upper part of the steering shaft 5. The lower part of the steering shaft 5 extending from the universal joint 6 is located outside the steering column 2, and is connected at its lower end to a steering gearbox 3 which is secured to a lower part of a front protector 4 of the forklift truck. The front protector 4 extends obliquely upwardly from the front end of the truck.

Figure 3:
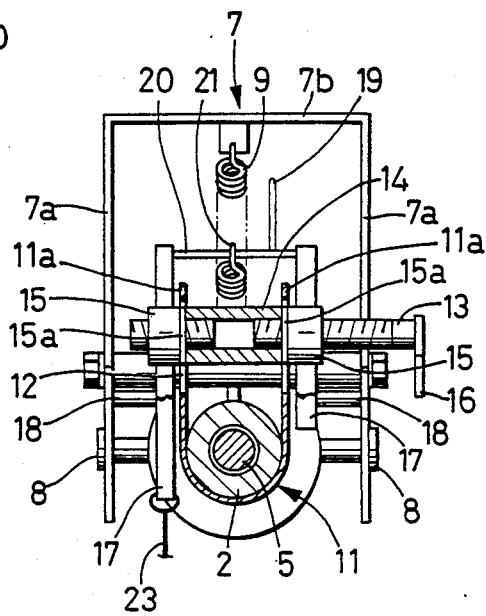
FIG. 3 is a fragmentary plan view of the system of FIG. 1.
Figure 7:
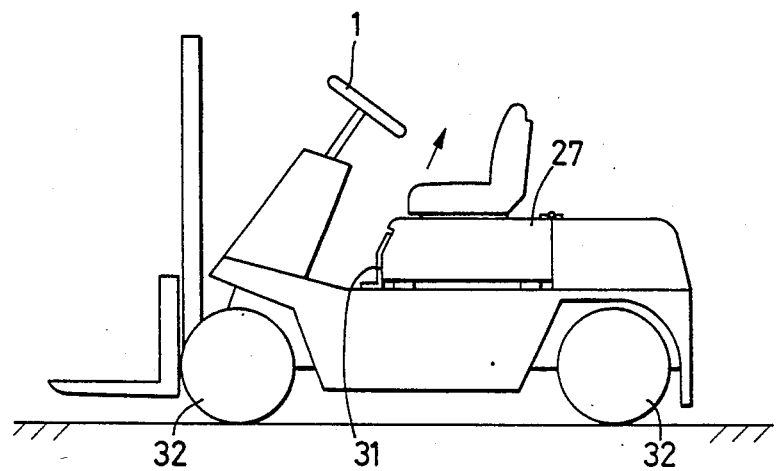
FIG. 7 is a view illustrating a conventional forklift truck.

A steering bracket 7 of a generally U-shaped cross sectional configuration (as seen in FIG. 3) is attached to the front protector 4. The steering bracket 7 has a pair of parallel side plates 7a, 7a, and a base portion 7b connecting the side plates 7a, 7a. The steering bracket 7 is secured at its base portion 7b to the front protector 4. The side plates 7a, 7a support, at their rear lower parts (as indicated in FIG. 1), connecting pivot pins 8, 8 that extend in opposite directions from opposite lateral walls of the steering column 2 at its lower end, such that the two pivot pins 8 are concentric with a pivot axis which passes the coupling point of the universal joint 6 and which is perpendicular to the axis of rotation of the steering shaft 5 as seen in FIG. 3, and parallel to an axis of rotation of drive wheels (indicated at 32 in FIG. 7) of the forklift truck. More specifically, the steering column 2 is supported pivotally about the pins 8 so that the column 2 may be tilted or pivoted from its operative position to its inoperative or rest position which is determined by a stop 10 provided so as to bridge the side plates 7a, 7a. The steering column 2 is biased toward its rest position by a spring 9 connected between the steering bracket 7 and the steering column 2. To a longitudinally intermediate portion of the steering column 2, there is fixed a column support 11 of a U-shaped cross sectional configuration (in FIG. 3) such that its arcuate portion connecting its opposed planar arm portions 11a, 11a is in contact with a peripheral surface of the column 2. The opposed arm portions 11a, 11a of the column support 11 have arcuate guiding portions in the form of arcuate slots 12 having an arc center located at the axis of the pivot pins 8 about which the steering column 2 and the steering shaft 5 are pivoted.

As shown in FIG. 3, a clamp screw 13 with right-hand and left-hand threads is inserted through the arcuate slots 12 in the opposed arm portions 11a, 11a of the U-shaped column support 11, and through a spacer sleeve 14 disposed between the arm portions 11a, 11a. As will be described in detail, this clamp screw 13 is used to clamp the steering column 2 at a desired tilt angle. The right-hand and left-hand threads of the clamp screw 13 engage movable members in the form of a pair of nuts 15 located on the outer sides of the arm portions 11a, 11a. Each of the nuts 15 is formed with a guide tab 15a which fits in the corresponding arcuate slot 12, so that the nut 15 is guided by the guide tab 15a along the arc of the arcuate slot 12 when the nut 15 is slidably moved on the corresponding arm portion 11a. Thus, the nut 15 acts as a slide which is slidable on the column support 11. The clamp screw 13 is provided at its one end with an operating lever 16. With the clamp screw 13 rotated with the lever 16 in one direction, the nuts 15 are moved toward each other to urge the opposed arm portions 11a against opposite ends of the spacer sleeve 14, whereby the nuts 15 are fixed to the column support 11 via the spacer member 14. With the clamp screw 13 rotated in the reverse direction, the nuts 15 are moved away from each other and from the arm portions 11a, 11a, and thus released from the column support 11. In this condition, the nuts 15 are slidably movable on the arm portions 11a along the arcuate slots 12 while they are guided by their guide tabs 15a.

Normally, the nuts 15 are fixed to the column support 11 by the clamp screw 13, and the steering column 2 is locked in its operative position with a column locking member in the form of a pair of locking hooks 17 engaging the nuts 15. Described in greater detail, the locking hooks 17 have a generally doglegged shape and are supported, pivotally about pins 18, on upper parts of the side plates 7a, 7a of the steering bracket 7. Each of the doglegged hooks 17 has a hooking end 17a which is formed so as to fit on the corresponding nut 15. Thus, the steering column 2 is locked in its operative position. With the hook 17 pivoted clockwise (in FIG. 1), the hooking end 17a is disengaged from the nut 15. The right and left locking hooks 17 are connected to each other by a pin 20 to which is fixed a release lever 19. The locking hooks 17 are biased in the counterclockwise direction (in FIG. 1) by a lock spring 21 connecting the pin 20 and the steering column 2, so that the locking ends 17a are normally held in locking engagement with the nuts 15. The engaging position of the locking hooks 17, i.e., their counterclockwise movement by the spring 21 is limited by the previously indicated stop 10.

One of the two locking hooks 17 is formed with a protrusion 17b adjacent to the pin 18. The protrusion 17b is connected by a wire cable 23, to a hood locking member in the form of a lock lever 22 which serves to lock an engine hood 27 in its normal closed position. The wire cable 23 is inserted through a tube 33 whose opposite ends are fixed to the steering bracket 7 and a bracket 34 secured to the floor plate 24. As is understood from FIG. 1, a counterclockwise movement of the lock lever 22 for releasing the engine hood 27 will cause the locking hooks 17 to be rotated clockwise, thereby releasing the hooking ends 17a from the nuts 15 (adjusting screw 13).

Stated more specifically referring to FIG. 1, the lock lever 22 is supported rotatably about a pin 26 on a bracket 25 which is formed of a folded upright part of the floor plate 24 of the truck. The lock lever 22 has a jaw portion 22a, a knob portion 22b, and an actuator portion 22c, which portions 22a, 22b, 22c are spaced radially of the pin 26. The jaw portion 22a is engageable with an engaging portion of the engine hood 27 in the form of a pin 28 which is fixed to an extension from a lower part of the front end of the engine hood 27, and the actuator portion 22c extends through the floor plate 24 and is connected at its free end to the wire cable 23. A reference numeral 29 designates a stop for determining the locking position of the lever 22 at which the engine hood 27 is locked.

The operation of the steering system and the locking device for the engine hood 27 will be described below.

Figure 4:
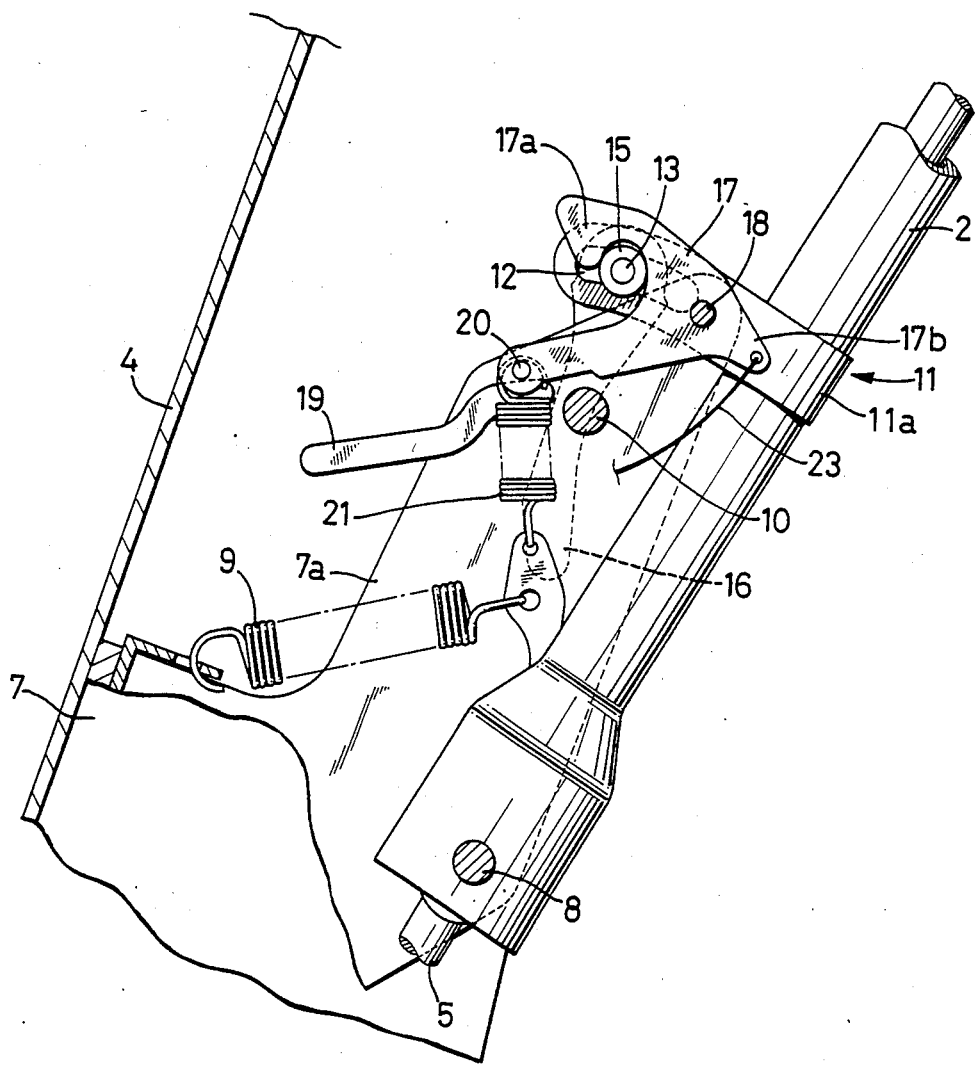
FIGS. 4 and 5 are enlarged fragmentary views showing two different positions of a device of the steering system.

While the engine hood 27 is locked in the normal closed position by the lock lever 22, the pair of locking hooks 17 engage the corresponding nuts 15 clamped to the column support 11 by the clamp screw 13. Thus, the steering column 2 is locked in its operative position, as shown in FIG. 4. In this position, rotating the clamp screw 13 with the lever 16 will cause the nuts 15 to be moved away from the arm portions 11a of the column support 11, whereby the nuts 15 are allowed to move slidably along the arcuate slots 12. The tilt angle of the steering column 2 may then be adjusted as desired, with the column support 11 being moved relative to the nuts 15, within a range of the arcuate slots 12.

Figure 5:
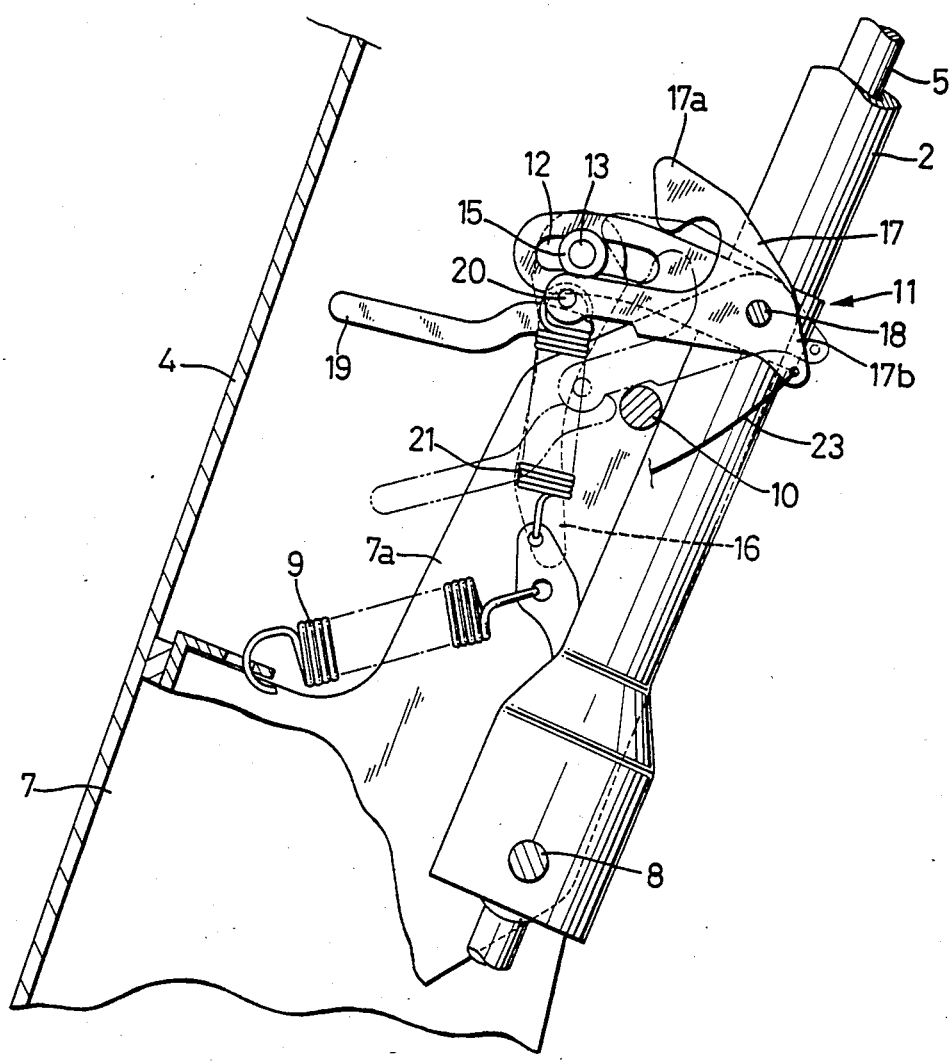
Figure 6:
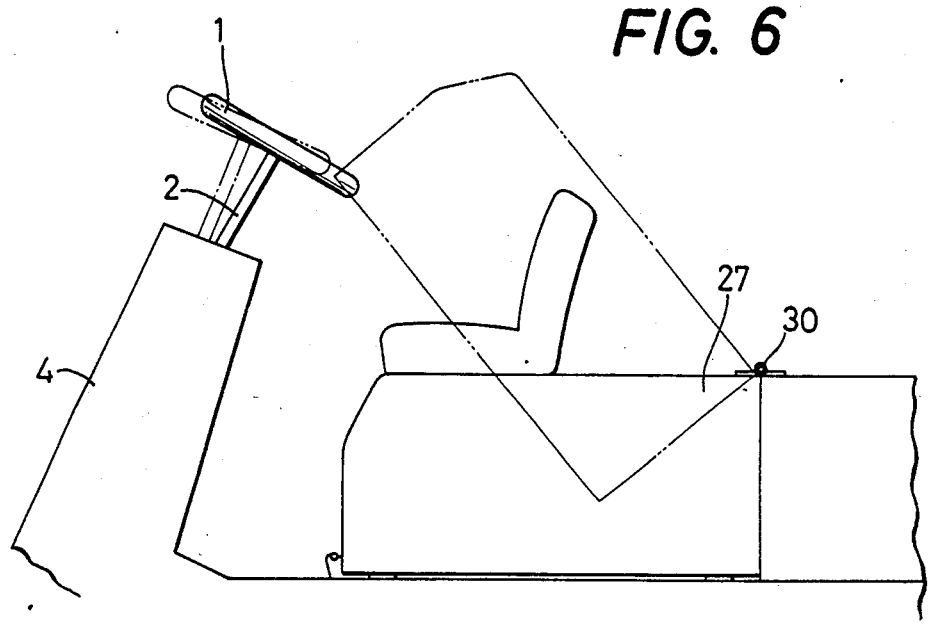
FIG. 6 is a schematic side elevational view illustrating a positional relation between a steering wheel of the system and an engine hood of the forklift truck.

If the lock lever 22 is rotated counterclockwise (as indicated by an arrow in FIG. 1) to disengage its jaw portion 22a from the lock pin 28 for releasing the engine hood 27 while the steering column 2 is locked in its operative position of FIG. 4, the pivotal movement of the lock lever 22 is imparted to the locking hooks 17 through the wire cable 23. As a result, the locking hooks 17 are pivoted clockwise, as shown in FIG. 5, against a biasing force of the spring 21, whereby the hooking ends 17a are disengaged from the nuts 15. As a result, the steering column 2 is tilted forward by a biasing force of the spring 9 with the clamp screw 13 being moved away from the front edge of the side plates 7a, 7a, until the tilting movement is blocked by the stop 10. Thus, the steering column 2 is held in its rest position. Thus, the lock lever 22 and the wire cable 23 constitute actuator means for pivoting the locking hooks 17 to their unlocking positions. By tilting the steering column 2 from its operative position to the rest position, the distance between the steering wheel 1 and the front end of the engine hood 27 is increased, whereby the engine hood 27 may be pivoted about a hinge 30 (FIG. 6), from its normal closed position to its upper open position, without an interference with the steering wheel 1, as indicated in phantom lines in FIG. 6. If an operating force applied to the lock lever 22 is released after the engine hood 27 is pivoted to its closed position, the locking hooks 17 are pivoted counterclockwise by a tensile force of the spring 21 until they abut on the stop 10, that is, returned to its locking position indicated in phantom lines in FIG. 5. In this position, the tip of each hooking end 17a is located on a path that is taken by the adjusting nut 15 when the steering column 2 is tilted back to its operative position.

After the engine hood 27 is returned to its closed position and the lock lever 22 is restored to its locking position for engagement with the lock pin 28, the steering column 2 is tilted back toward its operative position against the biasing force of the spring 9 with the clamp screw 13 being moved toward the side plates 7a, 7a. In the course of a tilting movement of the steering column 2 toward its operative position, the nuts 15 come into abutting contact with the corresponding hooking ends 17a of the locking hooks 17. A further tilting movement of the steering column 2 will cause the nuts 15 to pivot the locking hooks 17 slightly in the clockwise direction against the biasing action of the spring 21. Consequently, the nuts 15 are brought into engagement with the hooking ends 17a of the hooks 17. Thus, the steering column 2 is restored to and locked at its operative position.

While the foregoing description refers to the tilting movement of the steering column 2 to its rest position in response to the unlocking movement of the lock lever 22 (engine hood 27), it is possible to tilt the steering column 2 to its rest position by manipulating the release lever 19 fixed to the locking hooks 17. In this case, the movement of the steering column 2 to its rest position occurs irrespective of the unlocking movement of the lock lever 22 for the engine hood 27. It will be obvious that the release lever 19 also constitute actuator means for moving the locking hooks 17 to their unlocking position to permit the steering column to be tilted to its rest position.

Although the two nuts 15 are used as engaging means or a slider engageable with a column locking member in the form of the locking hooks 17, it is possible that at least one hook engages one of the nuts 15. Further, the column locking member may engage the clamp screw 13, rather than the nut or nuts 15. Still further, the nuts 15 may be replaced by other suitable engaging means or a slider whose position is normally fixed relative to the the steering column 2 but may be adjustable relative to the column 2. It will be understood that the locking hooks 17 may be replaced by other types of a locking member.

In the illustrated embodiment, the wire cable 23 is used as linking means for connecting the locking hooks 17 to the lock lever 22. However, other suitable mechanical links may be used. Further, the mechanical linkagae may be replaced by a combination of a limit switch and an electromagnet.

While the present invention has been described in its preferred embodiment with a certain degree of particularity, it is to be understood that the invention is not confied to the precise disclosure of the preferred embodiment, but may be otherwise embodied with various changes and modifications which may occur to those skilled in the art, without departing from the spirit and scope of the invention defined in the appended claims.

What is claimed is:

1. A steering system on a forklift truck having a frame and at least one steerable wheel, comprising:
   a steering wheel;
   a steering shaft, having an axis of rotation, to which said steering wheel is fixed;
   a tiltable steering column supporting said steering shaft for rotation about said axis, said steering column being supported by the frame of the forklift truck pivotally between an operative position and a rest position, about a pivot axis substantially perpendicular to said axis of rotation of the steering shaft 6;
   a spring disposed between said frame and said steering column biasing the steering column toward its rest position;
   engaging means provided on said steering column; said engaging means comprising a movable member which is adjustable in its position relative to said steering column in a pivoting direction of said steering column, to adjust an angle of tilt of said steering column in said operative position
   a column locking hook for locking said steering column in said operative position, said column locking hook being supported by said frame pivotally between a locking position wherein said column locking hook engages said engaging means and secures said steering column in said operative position, and an unlocking position; and
   actuator means associated with said colunm locking hook to pivot the column locking hook to said unlocking position and thereby permit said steering column to be pivoted to said rest position under the biasing action of said spring.

2. A steering system according to claim 1, wherein the forklift truck comprises an engine hood attached to said frame pivotally between a closed position and an open position about an axis parallel to said pivot axis of said steering column, said engine hood having an engaging portion engageable with a hood locking member attached to said frame to lock said engine hood in said closed position, said hood locking member being connected to said column locking hook by linking means which cooperates with said hood locking member to constitute said actuator means, said column locking hook being disengaged from said engaging means of said steering column when said hood locking member is disengaged from said engaging portion of said engine hood.

3. A steering system according to claim 2, wherein said linking means comprises a wire cable inserted through an outer tube which is fixed at its opposite ends to said frame.

4. A steering system according to claim 2, wherein said column locking hook is biased by a spring toward said locking position, said hood locking member being biased by said spring through said linking means in a direction of engagement with said engaging portion of said engine hood.

5. A steering system according to claim 1, wherein said actuator means comprises a release lever secured to said column locking hook to disengage the column locking hook from said engaging means of the steering column.

6. A steering system according to claim 1, wherein said steering shaft comprises an upper part and a lower part connected to each other by a universal joint pivotally about said pivot axis of said steering column, said steering wheel being fixed to an upper end of said upper part, said lower part of the steering shaft being connected at a lower end thereof to a steering gearbox.

7. A steering system on a forklift truck having a frame and at least one steerable wheel, comprising:
   a steering wheel;

a steering shaft having an axis of rotation to which said steering wheel is fixed;

a tiltable steering column supporting said steering shaft for rotation about said axis, said steering column being supported by the frame of the forklift truck pivotally between an operative position and a rest position about a pivot axis substantially perpendicular to said axis of rotation of the steering shaft;

a spring disposed between said frame and said steering column biasing the steering column toward its rest position;

a movable member which is adjustable in its position relative to said steering column in a pivoting direction of said steering column, to adjust an angle of tilt of said steering column in said operative position;

a column locking member supported movably between a locking position wherein said column locking member engages said movable member to lock said steering column in said operative position, and an unlocking position; and actuator means associated with said column locking member to move the column locking member to said unlocking position and thereby permit said steering column to be pivoted to said rest position under the biasing action of said spring.

8. A steering system according to claim 7, wherein said steering column has a column support secured thereto so as to extend in said pivoting direction, said column support having an arcuate guiding portion along a circular arc which has a center on said pivot axis of the steering column, said movable member comprising a slider which is movable along said arcuate guiding portion and fixed at a selected point along said circular arc.

9. A steering system according to claim 8, wherein said column support is of a generally U-shaped cross sectional configuration having a pair of arm portions extending in said pivoting direction, and a connecting portion connecting said arm portions, said column support being fixed at said connecting portion to said steering column, said arcuate guiding portion comprising at least one of a pair of arcuate slots formed in said pair of arm portions, respectively, and said movable member includes of a pair nuts slidable on said portions along said arcuate slots, respectively, said column support being provided with a spacer sleeve disposed between said pair of arm portions, and a clamp screw inserted through said pair of arcuate slots and said spacer sleeve, said clamp screw having a right-hand thread engaging one of said nuts and a left-hand thread engaging the other nut, said nuts being moved toward each other to urge said pair of arm portions against opposite ends of said spacer sleeve and thereby clamp said nuts to said column support when said clamp screw is rotated in one direction, said nuts being moved away from each other and allowed to be slidably moved along said arcuate slots when said clamp screw is rotated in the other direction.

10. A steering system according to claim 8, further comprising a front protector extending upwardly from a front end of said frame, and a steering bracket of a generally U-shaped cross sectional configuration, said steering bracket having a pair of side plates and a base portion connecting said side plates, and being secured at said base portion to said front protector, said steering column being pivotally supported by said pair of side plates at end portions of the side plates remote from said base portion, said locking hook being pivotally supported by said steering bracket.

11. A steering system according to claim 7, wherein said column locking member comprises a locking hook supported by said frame pivotally between said locking and unlocking position.

* * * * *